(12) United States Patent
Cohen et al.

(10) Patent No.: US 12,717,765 B1
(45) Date of Patent: Aug. 25, 2026

(54) METHOD FOR DEFRAGMENTATION MANAGEMENT

(71) Applicant: VAST DATA LTD., Tel Aviv (IL)

(72) Inventors: Ron Cohen, Tel Aviv (IL); Eli Malul, Tel Aviv (IL); Alex Soukhman, Tel Aviv (IL); Eyal Gordon, Tel Aviv (IL); Oren Ashkenazi, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 0 days.

(21) Appl. No.: 18/900,817

(22) Filed: Sep. 29, 2024

(51) Int. Cl.
*G06F 16/215* (2019.01)

(52) U.S. Cl.
CPC .................................. *G06F 16/215* (2019.01)

(58) Field of Classification Search
USPC ........................................................ 707/703
See application file for complete search history.

(56) References Cited

U.S. PATENT DOCUMENTS 5,701,480 A * 12/1997 Raz .......................... G06F 9/466 718/101
10,528,254 B2 * 1/2020 Bulkowski ............ G06F 3/0659
11,537,574 B2 * 12/2022 Nagayanallur Subramanian ........ G06F 11/0772
11,874,796 B1 * 1/2024 Kharatishvili ...... G06F 16/2365
2017/0220617 A1 * 8/2017 Bortnikov ........... G06F 16/2329
2018/0075083 A1 * 3/2018 Lee ..................... G06F 16/2379
2022/0019565 A1 * 1/2022 Nagayanallur Subramanian ........ G06F 11/3419
2023/0236966 A1 * 7/2023 Yarimi ................. G06F 3/0638 711/170

* cited by examiner

*Primary Examiner* — Cam Linh T Nguyen
(74) *Attorney, Agent, or Firm* — Reches Patents

(57) ABSTRACT

A method for defragmentation management, the method includes (a) moving, by a defragmentation process related to a set of database entries, content of a current subset of the set to a next subset of the set; (b) marking the current subset as being moved and linking the current subset to a location of the next subset; (c) receiving a user transaction write request for writing user data related to the current subset, following the moving; (d) writing the user data to the current subset and to the next subset, before the current subset is deleted; and (e) deleting the current subset when a start time of an oldest transaction follows a time of commit of the defragmentation process.

20 Claims, 8 Drawing Sheets

METHOD FOR DEFRAGMENTATION MANAGEMENT

BACKGROUND

Database systems that handle transactions are required to keep isolation between transactions, that determines the transaction integrity and visibility to other ongoing transactions. Different levels of isolations define different levels of concurrency and visibility, wherein the visibility defines when the changes made by one transaction become visible to statements of other transactions. For example, the database system's isolation mechanism can guarantee that transaction statements see the latest committed version of the data that is available according to the isolation rules, e.g., a version that includes changes that were committed prior to the transaction start time, or the statement start time.

A transaction conflict is a situation that arises when two transactions concurrently modify the same item. The conflict and the resolving of the conflict are defined according to the isolation rules, resulting in one of the transactions need to toll back changes it already made.

When a database is created and populated, initially, the data is placed contiguously. Over time, when the data is inserted, updated, and deleted, the sections holding the data become increasingly fragmented and the rows may become sparse. This non-contiguousness of rows and segments causes performance degradation, since the content required for responding to queries is scattered across more fragments, and also causes an increased metadata size, since each fragment needs to be associated with metadata that describes the fragment.

Therefore, there is a need to perform defragmentation operations for reorganizing data and updating metadata to achieve more contiguous content, in parallel to handling user transactions for updating the same content being modified by the defragmentation operations.

SUMMARY

There may be provided a method, a non-transitory computer readable medium as illustrated in the application.

BRIEF DESCRIPTION OF THE DRAWINGS

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings in which:

DETAILED DESCRIPTION OF THE DRAWINGS

The database system described herein performs defragmentation (defrag) operations in parallel to user transactions, while applying new rules for solving conflicts that involve both user transactions and system's internal transactions for performing the defrag operations.

Performing defrag operations can introduce conflicts with user transactions, where the user does not expect conflicts, if only user transactions are performed. For example, if there is only a single user transaction that is currently performed, it cannot result in conflicts, even if it does conflict with a system internal transaction.

Defrag operations are performed as transactions, so as to profit the transaction mechanisms, such as monitoring updates timing and transactions' state. However, user transactions are prioritized over defragmentation (defrag) transactions, when solving a conflict between the two types of transactions. Therefore, a user transaction can successfully overwrite content that was updated and committed by a defrag transaction after the user transaction's start time, even if the overwriting does not conform to the conflict resolve policy being used for regular (user) transactions.

Figure 1A:
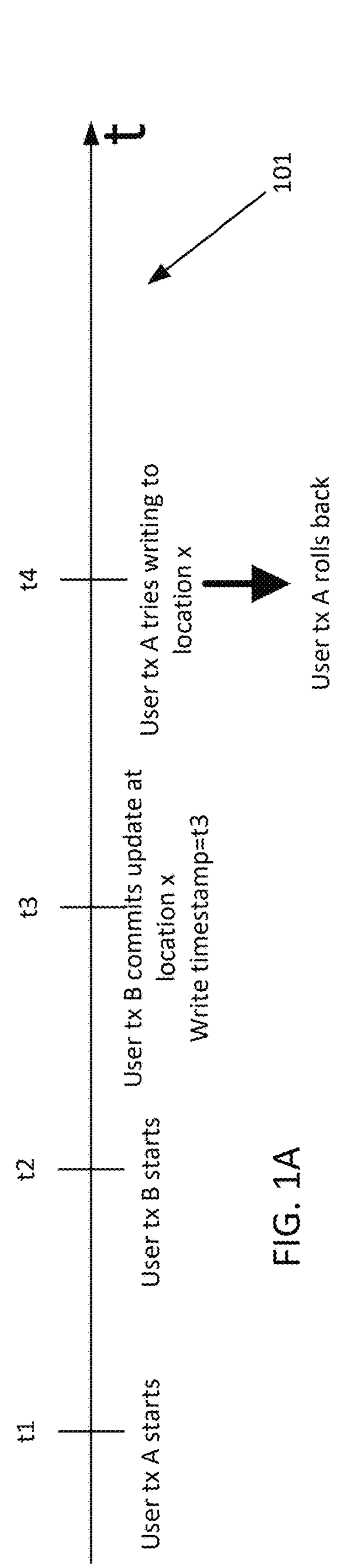
FIGS. 1A, 1B, 1C and 1D are examples of timing diagrams.

FIG. 1A illustrates a transaction timeline 101 of two conflicting user transactions. At time t1, a user transaction A starts. The transaction start time dictates which updates (of other transactions) are visible to the user transaction. In this case, only updates that were committed prior to the start time t1 are visible to user transaction A (and can be overwritten by transaction A).

At t2, a user transaction B starts. At t3, user transaction B commits an update to a certain location x (e.g., one or more cells, columns, or rows) of a database. At t4, user transaction A tries to write to location x. Since location x was updated after user transaction A was started, user transaction A cannot rely on the new content when performing the transaction, and particularly-cannot modify content that was updated after the start time of transaction A. This situation causes user transaction A to rollback, i.e., undoing the attempted update or any other update that was performed during the transaction. This conflict solving solution that relies on a transaction start time and the other examples described herein can be relied mutatis mutandis on a transaction statement start time, or on any other time within the transaction that is related to isolation policies and/or conflict policies.

Figure 1B:
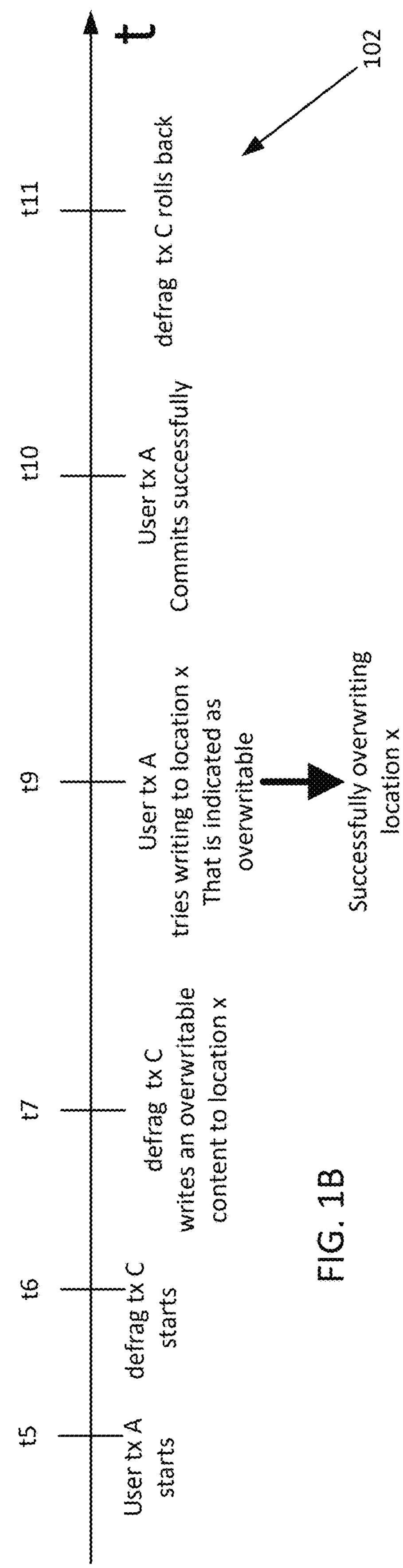
Figures 1C, 1D:
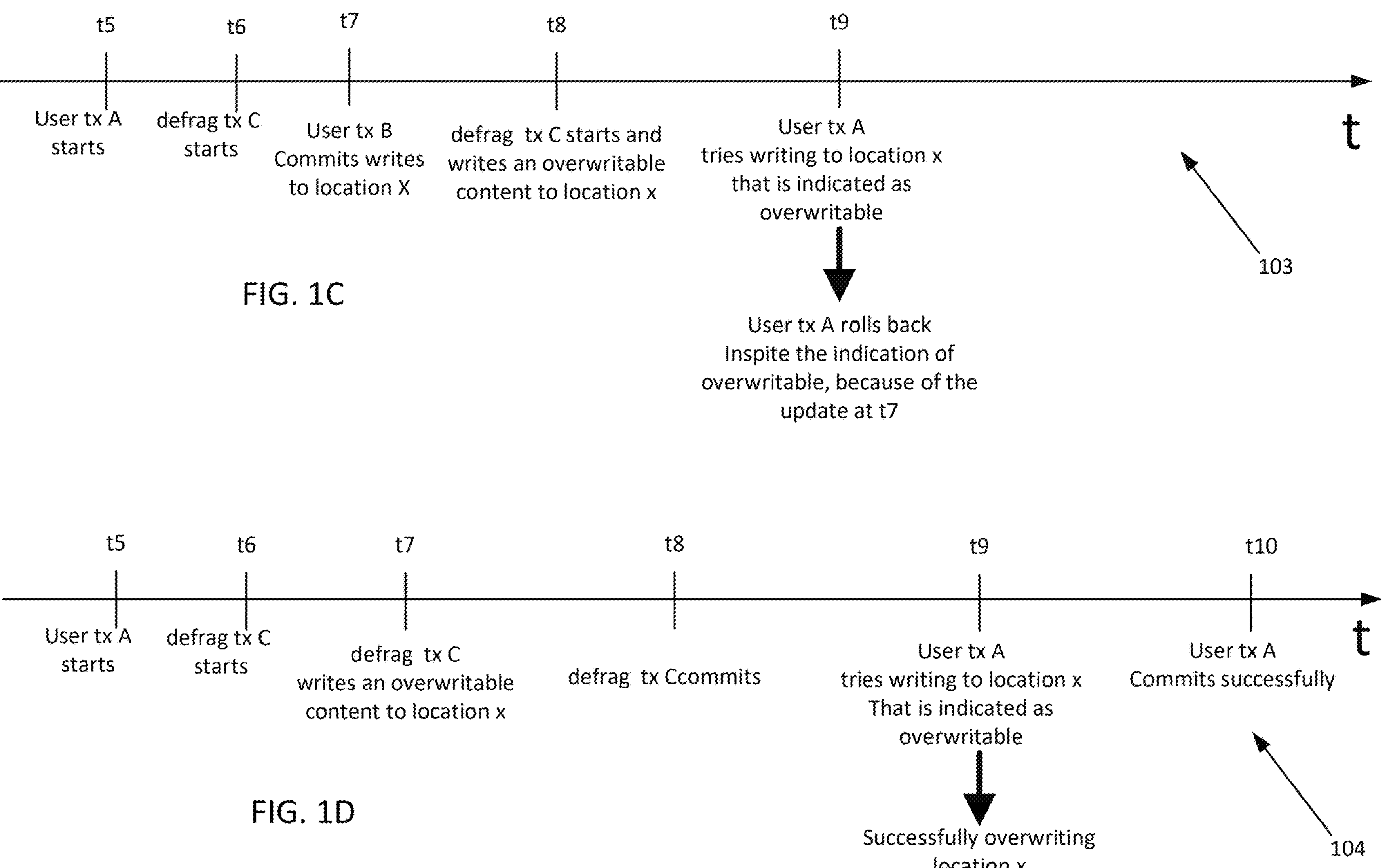

FIGS. 1B-1D refer to a defrag transaction that occurs in parallel to a user transaction. The defragmentation transaction rewrites the same content of a certain range of a database table in a more defragmented manner.

FIG. 1B illustrates a timeline 102 where a new rule for resolving a conflict is applied, when a defragmentation (defrag) transaction is involved. This rule favorites the user transaction. In order to distinguish a user transaction from a defrag transaction, each content that is updated as part of a defrag transaction is marked as an overwritable content that can be overwritten by a user transaction, under certain circumstances.

At time t5, user transaction A starts. At t6 or earlier, a defrag transaction C starts. At t7, defrag transaction C writes an overwritable content to location x, as part of a defrag operation. At t9, user transaction A tries to write to location x. According to the regular rules that conform to the isolation level, user transaction A should have been rolled back, either upon writing or upon committing of the transaction. However, since the update done at location x is indicated as an overwritable update-user transaction A can successfully overwrite location x, and successfully commit user transaction A (e.g., at t10), without being required to rollback. At t11, defrag transaction C rolls back, following the update made by user transaction A.

Note that location X is overwritable when no other user transaction wrote to location X from the start time t5 of user transaction A, until the update time by user transaction A, at t9.

FIG. 1C illustrates a timeline 103 that is similar to timeline 102 of FIG. 1B. The difference is an involvement of a third transaction, an additional user transaction B, that commits writes to the same location x at t7, after the start time t5 of user transaction A, before location x became overwritable at t8 (in response to a write by defrag transaction C) and further before user transaction A attempts an update at t9.

When user transaction A attempts an update at t9, it is determined that the content written at t8 in location x is overwritable, because the last transaction that wrote to location x was a defrag transaction. However, it still cannot be overwritten by user transaction A, since there is still a write conflict with a former update by user transaction B that wrote after the start time t5 of user transaction A and before the update attempted by user transaction A.

When checking for conflicts, the updates that are evaluated are those that were performed since the start time of the transaction that performs the check and until the time the conflict check is performed. The check proceeds from the last update that was written to the given location and backwards until the start time of the transaction. Therefore, the overwritable indication actually indicates that this update can be ignored and skipped during the conflict detection and resolution. In this example, the conflict check skips the check of the update by the defrag transaction at t8, but still needs to check older updates that occurred after the start time t5 and before the write attempt at t9 of user transaction A.

FIG. 1D illustrates a timeline 104 that is similar to timeline 102 of FIG. 1B. The difference is the timing of the committing of defrag transaction C. In FIG. 1B defrag transaction C is not yet committed at time t9, when a potential write conflict is resolved by allowing user transaction A to overwrite location x that was written by defrag transaction C. Therefore, defrag transaction C needs to rollback, e.g., at t11 of FIG. 1B. In FIG. 1D, defrag transaction C is committed at time t8, before user transaction A tries and succeeds writing to location x. Therefore, the changes made by defrag transaction C at time t7 can be usable at t9, by user transaction A, even if the using (overwriting) the defrag updates conflicts the isolation rule that defines that updates that were committed after start time of a transaction are invisible to the transaction. There is no need to rollback defrag transaction C, since its changes are self consistent.

Thus, according to an embodiment, when checking for write conflicts of a user transaction, the evaluation starts with the last committed update by another transaction, to a location that was written by the user transaction, that occurred during a time frame that is to be ignored by the user transaction, due to the isolation rules, for example, the time frame that starts at the start time of the user transaction and ends before or at the time of the conflict check. If the last update is marked as overwritable (done by a defrag transaction), the conflict check proceeds to checking whether there are more committed updates (by other transactions), that preceded the last update, during this time frame. If not—there is no conflict, and the user transaction successfully commits the update. If there is a previous update that preceded the last update, that is not marked as overwritable (i.e., done by another user transaction)—then the user transaction is rolled back. If the previous updates are all marked as overwritable—the user transaction commits successfully.

Figure 2:
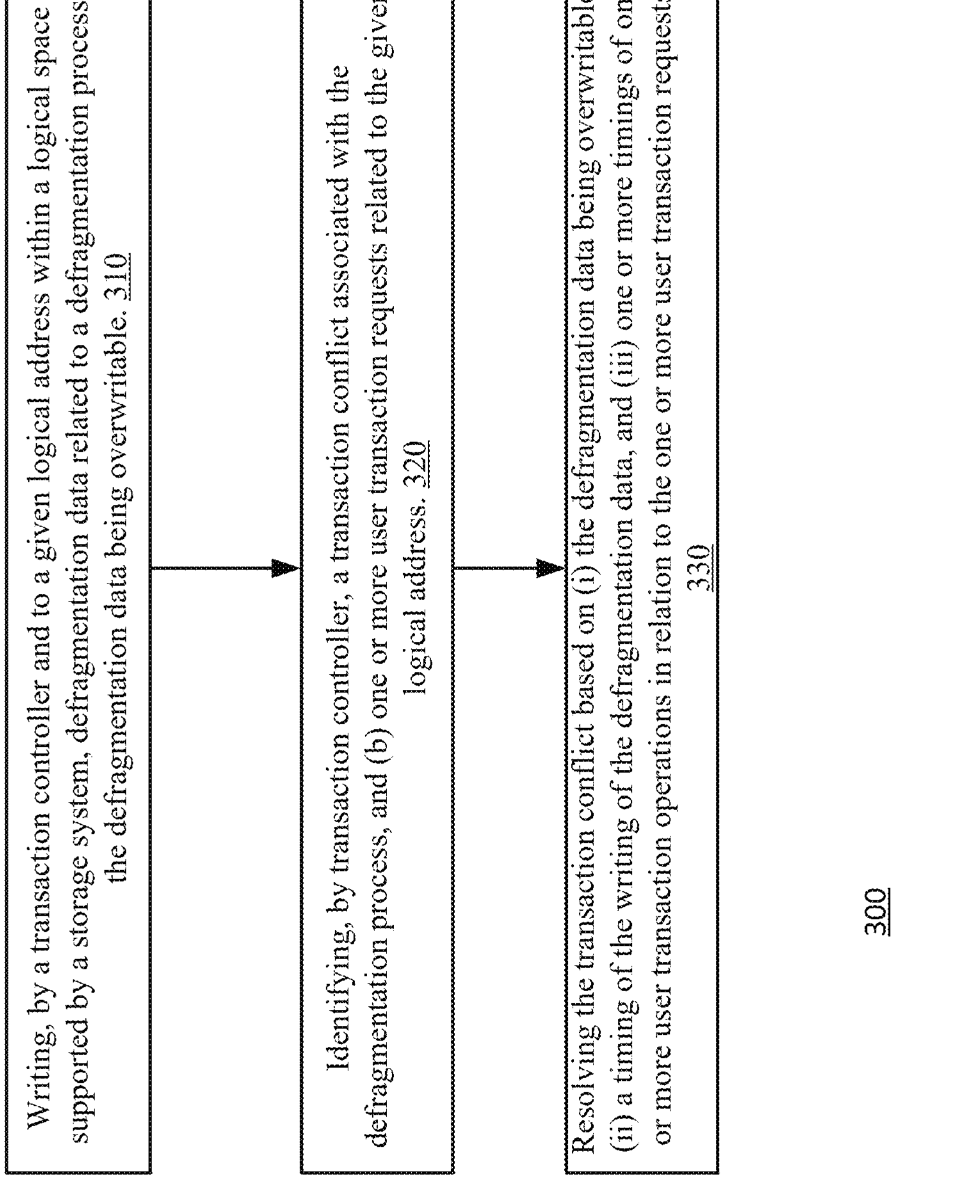
FIG. 2 is an example of a method.

FIG. 2 illustrates method 300 for transaction conflict management.

According to an embodiment, method 300 includes step 310 of writing, by a transaction controller and to a given logical address within a logical address space supported by a storage system, defragmentation data related to a defragmentation process, the defragmentation data being overwritable. The given logical address may store a part of the content of a database table. The defragmentation data may be data that was rearranged by a defragmentation process and rewritten in a defragmented form, by the transaction manager. The writing may be a part of a defragmentation transaction, which is a non-user transaction, and initiated internally by the storage system.

According to an embodiment step 310 is followed by step 320 of identifying, by the transaction controller, a transaction conflict associated with the defragmentation process, and (b) one or more user transaction requests related to the given logical address. The one or more user transaction requests, are requests that are part of a user transaction, that are related to the given logical address, and may be requests to write or to commit data written to the given logical address. The user transaction requests are related to transactions that were initiated by a user of the storage system, and received from the user by the storage system. A transaction request is a request to perform a transaction operation-so that once a transaction request is approved—the associated transaction operation is executed, Step 320 may be executed as part of a process for checking conflicts upon a conflict check point in time that can occur during the processing of a transaction, e.g., upon: a commit of a user transaction, upon a write of a user transaction, upon a commit of a defragmentation transaction, or upon a write by a defragmentation transaction.

According to an embodiment, when there is no transaction conflict, the writing may be committed.

According to an embodiment, step 320 is followed by step 330 of resolving the transaction conflict based on (i) the defragmentation data being overwritable, (ii) a timing of the writing of the defragmentation data, and (iii) one or more timings of one or more user transaction operations in relation to the one or more user transaction requests. Step 330 may include checking data that was written to the given logical address by other transactions that are not the certain transaction that initiated the conflict check. The checking may be of data that was written within a time frame that preceded the time of the checking and succeeded the start time of the certain transaction. Step 330 may include identifying that a data that was written within the time frame is overwritable defragmentation data. Overwritable indication was added to the data (or to the metadata describing the data) by the defragmentation process.

The fact that the defragmentation data being overwritable prioritizes, in some case, the writing of a conflicting user data, as illustrated in FIGS. 1B-1D.

According to an embodiment, the one or more timings of the one or more user transaction operations are related to committing of the one or more user transaction operations. In this case the conflict resolution considers committed user transactions and provides less weight or even ignores user transactions that are not committed. According to another embodiment, the one or more timings of the one or more user transaction operations are related to the writing time of data to the given logical address, by the one or more user transaction operations, even if this data is not yet committed.

According to an embodiment, the one or more timings of the one or more user transaction operations are related to a writing data (whether committed or not) of the one or more user transaction operations. In this case even a transaction that just started may impact the conflict resolution- and this approach may increase the number of identified conflicts but may be safer.

According to an embodiment, step 330 includes rolling back the writing of the defragmentation process when a user transaction wrote committed data (or in some cases, uncommitted data) to the given logical address, between a start of the writing of the defragmentation data and a committing of the writing of the defragmentation data. See, for example FIG. 1B. The rolling back of the writing of the defragmentation process may be part of checking conflicts that are related to the defragmentation process.

According to an embodiment, step 330 includes rolling back a user transaction when another user transaction wrote data to the given logical address (committed or uncommitted data) between a start of the user transaction and an attempt of the user to write the user data. See, for example, FIG. 1C. The rolling back of the user transaction may be part of checking conflicts that are related to the user transaction.

According to an embodiment, step 330 includes committing a user transaction related to the one or more user transaction requests, when the defragmentation transaction wrote defragmentation data to the given logical address between a start of the user transaction and an attempt of the user to write the user data. See, for example, FIG. 1C.

According to an embodiment there is provided a non-transitory computer readable medium for executing method 300.

According to an embodiment, the non-transitory computer readable medium stores instructions executable by a processor for: writing, by a transaction controller and to a given logical address within a logical address space supported by a storage system, defragmentation data related to a defragmentation process, the defragmentation data being overwritable; identifying, by the transaction controller, a transaction conflict associated with the defragmentation process, and (b) one or more user transaction requests related to the given logical address; and resolving the transaction conflict based on (i) the defragmentation data being overwritable, (ii) a timing of the writing of the defragmentation data, and (iii) one or more timings of one or more user transaction operations in relation to the one or more user transaction requests.

Defragmentation can write in-place, as described above, or out-of-place, when content needs to be relocated. An example of out-of-place updates is when rows of a sparse row group need to be relocated in order to eliminate empty rows (that were deleted) in a row group (a group of consecutive rows).

The following examples refer to relocation of rows, but the method described herein is applicable to any relocation of content in a database table, that are not part of a user request, but part of a background maintenance process.

Fixing a sparse row group may be performed as a relocation transaction (or defragmentation transaction that relocates rows or other parts of a database table)) that performs the relocation operation and includes removing the live rows (that were not deleted by a user transaction) from the original location and reinserting the content of the live rows in a new location of the database table (new rows), e.g., in a consecutive manner. When all the rows are relocated, the relocation transaction is committed.

A problem may arise when a user transaction updates a row in its original location after it was removed from the original location and relocated to another row by a non-user relocation transaction. This may happen while the relocation transaction is not committed, but may also happen after the relocation transaction is committed, if the relocation is invisible to the user transaction, according to the isolation rules, e.g., if the user transaction started before the committing of the relocation transaction. See for example, FIG. 3 that illustrates a time line, where at t1 a user transaction starts, at t2 a non-user relocation transaction commits a row relocation (the relocation may be performed before or after t1), and at t3, the user transaction accesses and even updates the relocated row in its old location, since the relocation is invisible to the user transaction, i.e., should be ignored according to the isolation rules.

According to an embodiment, each original row that needs to be relocated to a new row, is not physically deleted, but only marked as moved, and is further associated with a pointer to the new row. So, when a user transaction updates at least part of the content in the old (original) row, the updated part of the row is duplicated to the new row, based on the pointer, including the metadata related to the transaction, e.g., transaction identifier, timestamps, etc. The association of the old row with the pointer to the new location may be implemented as a hidden column that stores the new locations of relocated rows. The hidden column is not visible to users. The indication about the moved row may also be implemented as a hidden column.

Figure 3:
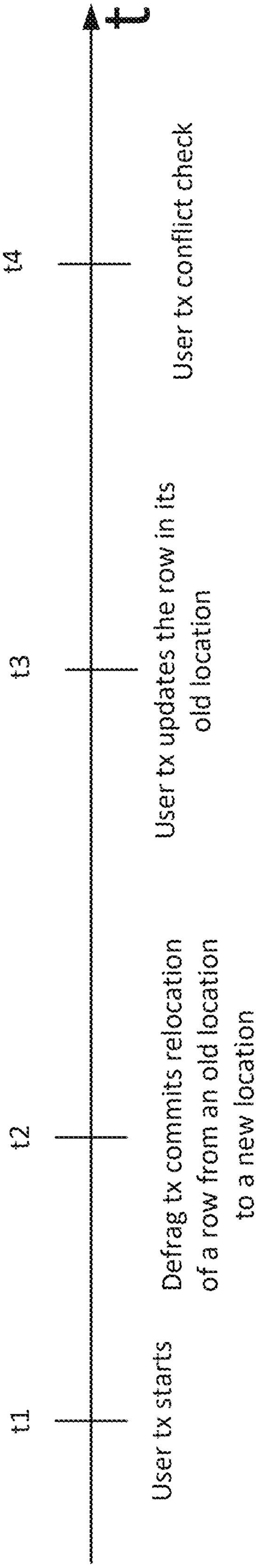
FIG. 3 is an example of a timing diagram.

User transactions to which the relocation is invisible, i.e., user transactions that are aware only of the old row, can check for conflicts against the old row, upon transaction conflict check, for example at t4 of FIG. 3. User transactions to which the relocation is visible according to the isolation rules, i.e., user transactions that are aware only of the new row (e.g., user transactions that started after the committing of the relocation transaction), can check for conflicts against the new row, which content is identical to the old row.

The old rows are maintained (not physically deleted) as long as there are transactions to which the old rows are visible, according to the isolation rules. The old rows are physically deleted when there are no more active transactions that can see the old rows, according to the isolation rules, e.g., when there are no transactions that started before the committing of writes by the relocation transaction. The system may maintain the time of the start time of the oldest transaction at each moment, and delete the old rows only when the start time of the oldest transaction exceeds the commit time of the relocation transaction.

Figure 4:
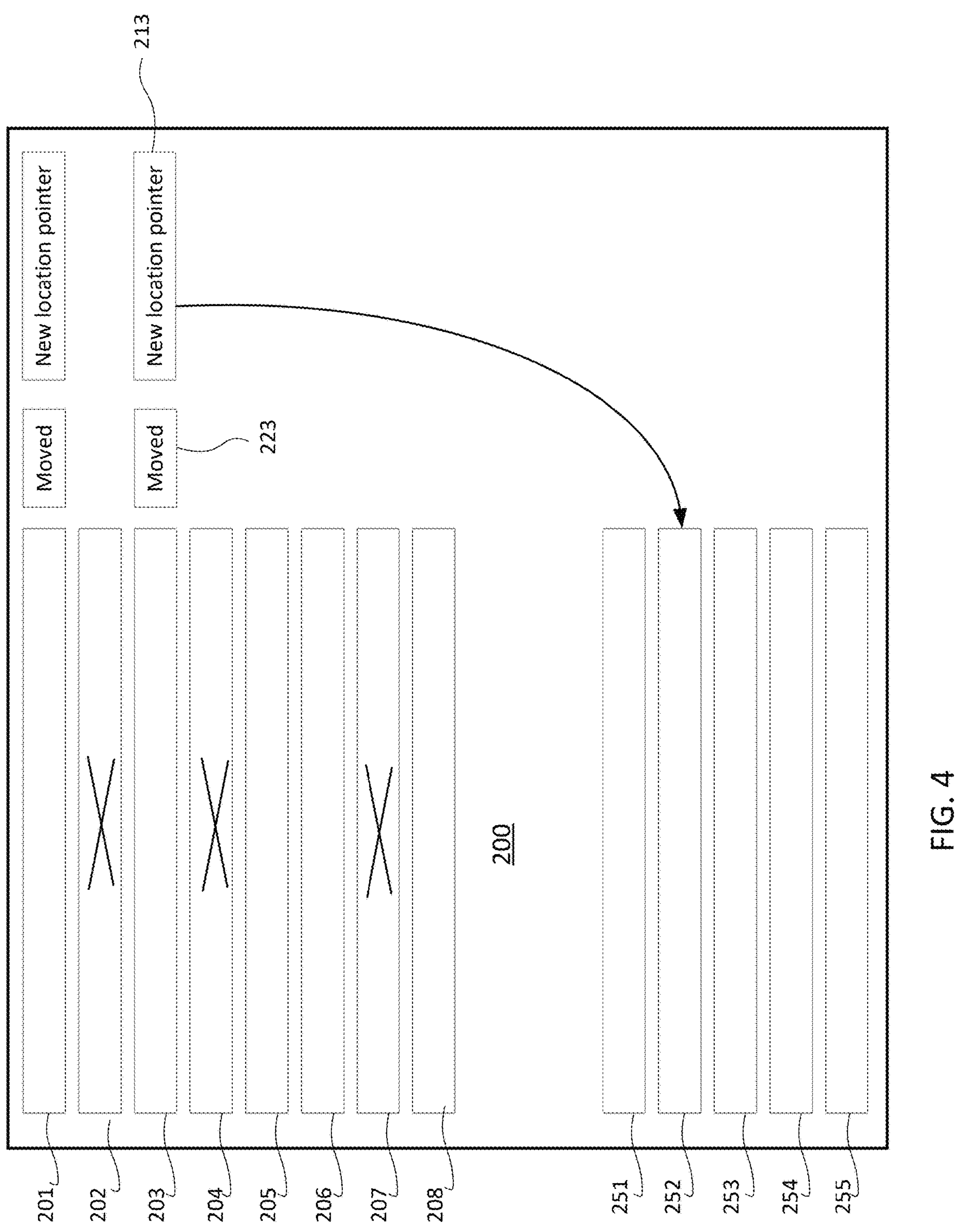
FIG. 4 is an example of a database.

FIG. 4 illustrates a database table 200, where a group of rows in locations 201-208 becomes sparse, after several rows were deleted in response to user requests to delete these rows, e.g., the rows 202, 204 and 207. As part of the relocation transaction for rearranging the row group while eliminating empty rows, the old rows 201, 203, 205, 206 and 208, in the old (previous) location, are relocated to a free space in the table, e.g., new rows 251-255, respectively. Each old row that was copied to its new location is associated with a reference to the new row (pointer or other identifier of the new row), such as new location pointer 213 that is associated with old row 203, and further associated with an indication 223 indicating that the row was moved and is candidate for deletion, once it is not visible to any transaction.

Figure 5:
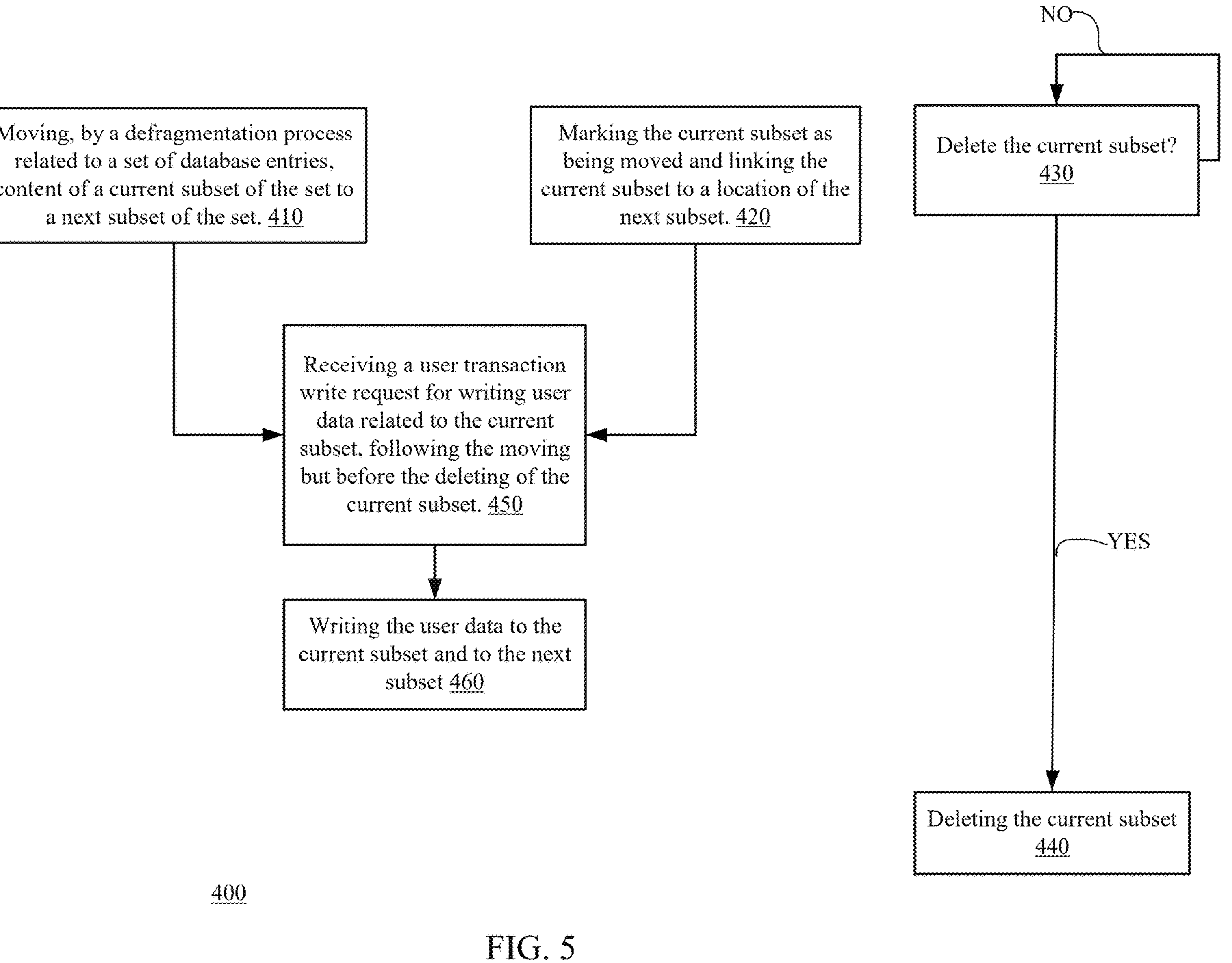
FIG. 5 is an example of a method.

FIG. 5 illustrates an example of method 400 for defragmentation management in parallel to handling user transactions.

According to an embodiment, method 400 includes step 410 of moving, by a defragmentation process related to a set of database entries, content of a current subset of the set to a next subset of the set. The set of database entries may be, for example, a group of rows (or any other type of entries) that the defragmentation process needs to move in order to rearrange the entries in a defragmented (e.g., contiguous) manner. The current subset refers to the current location (e.g., row) of the content to be moved, within the database table. After the entry is moved, but still not deleted from the current location, the location may be referred to as the old location. The next subset refers to the new location of the content.

According to an embodiment, this is an initial movement and during an initial point in time the content of the current subset is moved to the next subset.

Nevertheless, step 410 does not end the process as there may be user transactions that will still access the current subset-since at the start of a user transaction, the address of the current subset was provided to the user transaction, so that the current subset at the provided address is used by the user transaction, as long as the transaction is not completed (either committed or rolled back).

According to an embodiment method 400 also includes step 420 of marking the current subset as being moved and linking the current subset to a location of the next subset.

Steps 410 and 420 may be executed concurrently.

According to an embodiment, the set of the database entries comprises multiple rows of the database and wherein the current subset is a row of the multiple rows.

According to an embodiment, the set of the database entries comprises multiple columns of the database and wherein the current subset is a column of the multiple columns.

According to an embodiment, the marking of the current subset as being moved comprises setting a current subset status indicator to a first value.

According to an embodiment, the current subset status indicator is a bit out of a bit-line subset indicators of the database. Alternatively, the current subset status indicator is a cell in a hidden column of the database table.

According to an embodiment, the linking of the current subset to the location of the next subset comprising setting a value of a pointer associated with the current subset to an address of the next subset. The first value (that indicates a moved content) and the value of the pointer may be included in the same field with a combined value, wherein a certain value (e.g., zero) indicates a non-moved content, and a pointer value (that is e.g., above zero, or different from the certain value)—indicates a moved row along with the information needed to access its new location.

According to an embodiment, method 400 also includes step 430 of checking when to delete the current subset. The current subset can be deleted when there are no transactions that still "remember" the current subset. Accordingly—the current subset is deleted when a start time of an oldest transaction follows a time of commit of the defragmentation process.

Step 430 is followed by step 440 of deleting the current subset-when determining to delete the current subset.

According to an embodiment, steps 410 and 420 are followed by step 450 of receiving a user transaction write request for writing user data related to the current subset, following the moving.

Assuming that the execution of step 440 was not completed-step 450 is followed by step 460 of writing the user data to the current subset and to the next subset, before the current subset is deleted. The user data is duplicated and written to both subset locations.

According to an embodiment, following the execution of step 440, all the transactions will refer to the next subset and not to the current subset. Before step 440 is executed, some of the user transactions may refer to the next subset, if started after the time of commit of the defragmentation process.

Figure 6:
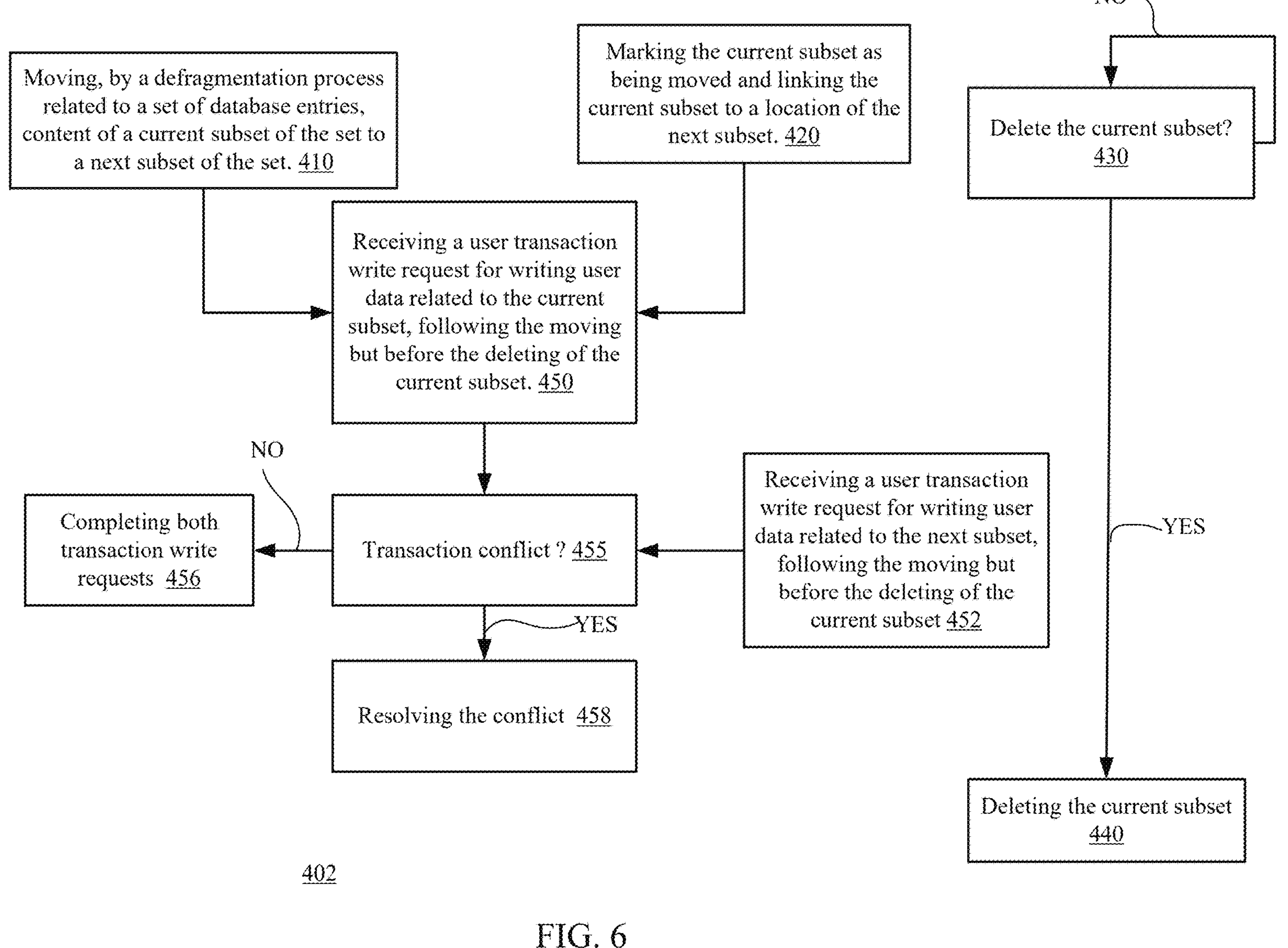
FIG. 6 is an example of a method.

FIG. 6 illustrates an example of method 402 for defragmentation management.

According to an embodiment, method 402 includes step 410 of moving, by a defragmentation process related to a set of database entries, content of a current subset of the set to a next subset of the set.

According to an embodiment, this is an initial movement and during an initial point in time the content of the current subset is moved to the next subset.

Nevertheless, step 410 does not end the process as there may be transactions that will still access the current subset—as at the start of a user transaction, the address of the current subset was provided to the user transaction.

According to an embodiment method 402 also includes step 420 of marking the current subset as being moved and linking the current subset to a location of the next subset.

Steps 410 and 420 may be executed concurrently.

According to an embodiment, the set of the database entries comprises multiple rows of the database and wherein the current subset is a row of the multiple rows.

According to an embodiment, the set of the database entries comprises multiple columns of the database and wherein the current subset is a column of the multiple columns.

According to an embodiment, the marking of the current subset as being moved comprises setting a current subset status indicator to a first value.

According to an embodiment, the current subset status indicator is a bit out of a bit-line subset indicators of the database. Alternatively, the current subset status indicator is a cell in a hidden column of the database table.

According to an embodiment, the linking the current subset to the location of the next subset comprising setting a value of a pointer associated with the current subset to an address of the next subset.

According to an embodiment, method 400 also includes step 430 of checking when to delete the current subset. The current subset can be deleted when there are no transactions that still "remember" the current subset. Accordingly—the current subset is deleted when a start time of an oldest transaction follows a time of commit of the defragmentation process.

Step 430 is followed by step 440 of deleting the current subset-when determining to delete the current subset.

According to an embodiment, steps 410 and 420 are followed by step 450 of receiving a user transaction write request for writing user data related to the current subset, following the moving.

Assuming that the execution of step 440 was not completed-step 450 is followed by step 455 of checking whether there is a transaction conflict.

A transaction conflict may occur if another transaction requests to write to the same database entry-whether the database entry is located at the current subset or whether the database entry is located at the next subset.

Assuming, for example, that method 402 includes step 452 of receiving a user transaction write request for writing user data related to the next subset, following the moving but before the deleting of the current subset.

Under this assumption, step 455 includes checking whether there is a conflict between the transaction of step 450 and the transaction of step 452.

If there is no conflict-both transaction write requests are completed (see step 456)—else step 455 is followed by step 358 of resolving the conflict.

According to an embodiment, step 358 includes a least one of:

a. rolling back one of the user transaction write request for writing user data related to the next subset and the user transaction write request for writing user data related to the current subset when detecting the transaction conflict.

b. Prioritizing the user transaction write request for writing user data related to the current subset over the user transaction write request for writing user data related to the next subset-when detecting the transaction conflict. This may speed up the closing of the current dataset.

c. Prioritizing the user transaction write request for writing user data related to the next subset over the user transaction write request for writing user data related to the current subset-when detecting the transaction conflict.

Figure 7:
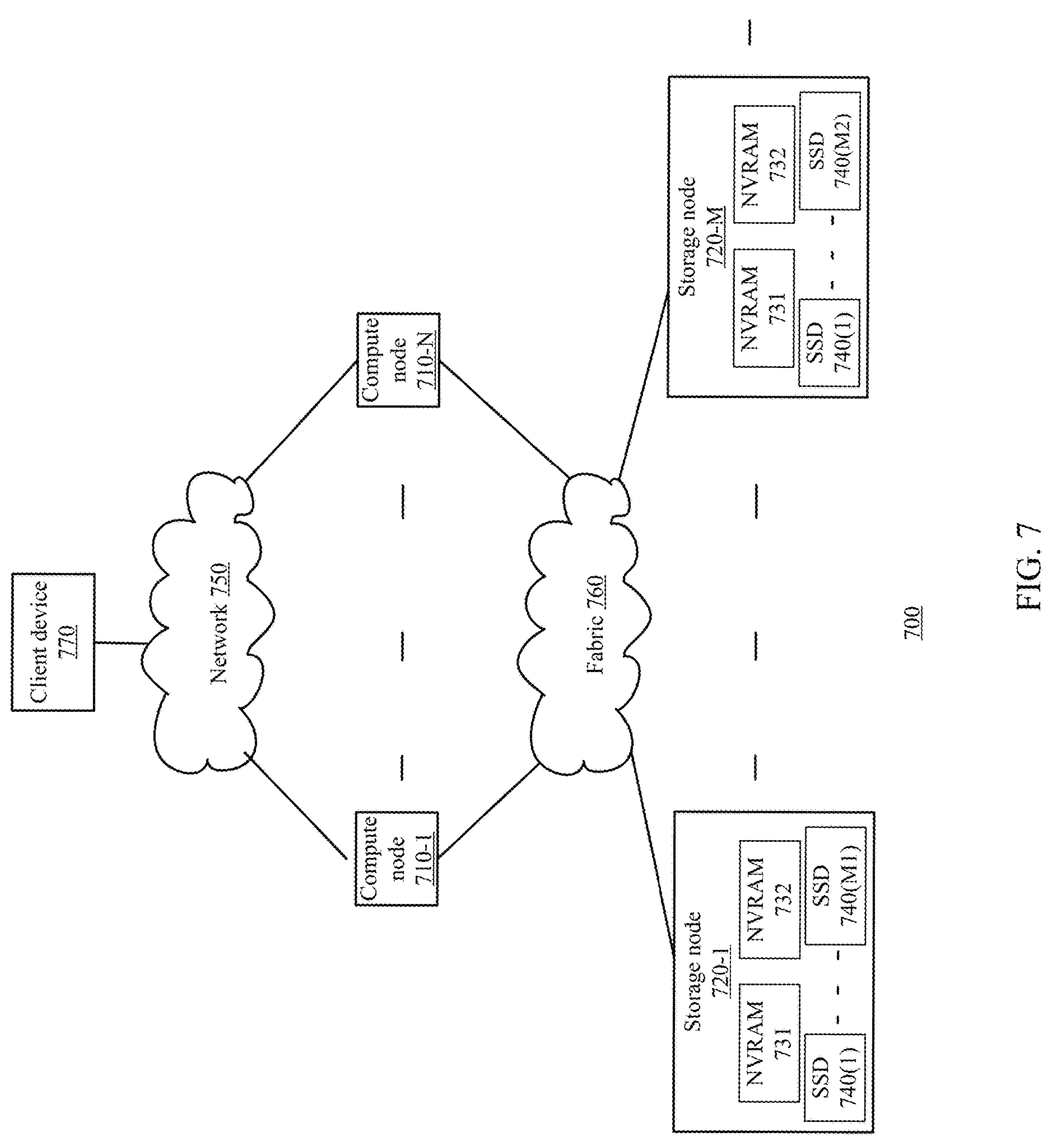
FIG. 7 is an example of a storage system.

FIG. 7 illustrates an example of a storage system 700 that includes multiple (N) compute nodes 710-1 to 710-N and multiple (M) storage nodes 720-1 to 720-M. The compute nodes implement the logic of the storage system and are configured to execute method 400 and/or method 402. The compute nodes communicate with the storage nodes via a network, such as fabric 760, and with one or more client of the database, such as client device 770, via network 750. The storage nodes include various storage devices, such as NVRAM (Non Volatile Random Access Memory) 731 and 732, SSDs (Solid State Drives) 740(1)-740(M1) of storage node 720-1, and SSDs 740(1)-740(M2) of storage node 720-2. The data stored in the database are stored in various storage devices of the storage nodes.

According to an embodiment, there is provided a non-transitory computer readable medium for defragmentation management, the non-transitory computer readable medium stores instructions executable by a defragmentation processor for: moving, by a defragmentation process related to a set of database entries, content of a current subset of the set to a next subset of the set; marking the current subset as being moved and linking the current subset to a location of the next subset; receiving a user transaction write request for writing user data related to the current subset, following the moving; writing the user data to the current subset and to the next subset, before the current subset is deleted; and deleting the current subset when a start time of an oldest transaction follows a time of commit of the defragmentation process.

Any reference to "may be" should also refer to "may not be".

In the foregoing detailed description, numerous specific details are set forth in order to provide a thorough understanding of the one or more embodiments of the disclosure. However, it will be understood by those skilled in the art that the present one or more embodiments of the disclosure may be practiced without these specific details. In other instances, well-known methods, procedures, and components have not been described in detail so as not to obscure the present one or more embodiments of the disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present one or more embodiments of the disclosure and in order not to obfuscate or distract from the teachings of the present one or more embodiments of the disclosure.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by a system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, any part of the specification and/or any claims may be provided. Especially any combination of any claimed feature may be provided.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for defragmentation management, the method comprising:

moving, by a defragmentation process related to a set of database entries, content of a current subset of the set to a next subset of the set;

marking the current subset as being moved and linking the current subset to a location of the next subset;

receiving by a transaction controller, a user transaction write request for writing user data related to the current subset, following a start of the moving;

writing, by the transaction controller, the user data to the current subset and to the next subset, before the current subset is deleted;

determining whether the current subset can be deleted, based on user transactions that accessed the current subset after the start of the moving; and deleting the current subset when a start time of an oldest transaction, among the user transactions, follows a time of commit of the defragmentation process.

2. The method according to claim 1, comprising:

receiving a user transaction write request for writing user data related to the next subset, following the moving but before the deleting of the current subset; and performing a transaction conflict check related to the current subset and the next subset.

3. The method according to claim 2 wherein the transaction conflict check is related to database entries of the current subsets and corresponding database entries of the next subset.

4. The method according to claim 2, comprising rolling back one of the user transaction write request for writing user data related to the next subset and the user transaction write request for writing user data related to the current subset, when detecting the transaction conflict.

5. The method according to claim 2, prioritizing the user transaction write request for writing user data related to the current subset over the user transaction write request for writing user data related to the next subset, when detecting the transaction conflict.

6. The method according to claim 1 wherein the set of the database entries comprises multiple rows of the database and wherein the current subset is a row of the multiple rows.

7. The method according to claim 1 wherein the set of the database entries comprises multiple columns of the database and wherein the current subset is a column of the multiple columns.

8. The method according to claim 1 wherein the marking of the current subset as being moved comprises setting a current subset status indicator to a first value.

9. The method according to claim 8 wherein the current subset status indicator is a cell in a hidden column of the database.

10. The method according to claim 1 wherein the linking of the current subset to the location of the next subset comprising setting a value of a pointer associated with the current subset to an address of the next subset.

11. A non-transitory computer readable medium for defragmentation management, the non-transitory computer readable medium stores instructions executable by a defragmentation processor for:

moving, by a defragmentation process related to a set of database entries, content of a current subset of the set to a next subset of the set;

marking the current subset as being moved and linking the current subset to a location of the next subset;

receiving by a transaction controller, a user transaction write request for writing user data related to the current subset, following a start of the moving;

writing, by the transaction controller, the user data to the current subset and to the next subset, before the current subset is deleted;

determining whether the current subset can be deleted, based on user transactions that accessed the current subset after the start of the moving; and deleting the current subset when a start time of an oldest transaction, among the user transactions, follows a time of commit of the defragmentation process.

12. The non-transitory computer readable medium according to claim 11, that stores instructions for:

receiving a user transaction write request for writing user data related to the next subset, following the moving but before the deleting of the current subset;

performing a transaction conflict check related to the current subset and the next subset; and at an absence of a transaction conflict, updating the current subset and the next subset.

13. The non-transitory computer readable medium according to claim 12 wherein the transaction conflict check is related to database entries of the current subsets and corresponding database entries of the next subset.

14. The non-transitory computer readable medium according to claim 12, that stores instructions for rolling back one of the user transaction write request for writing user data related to the next subset and the user transaction write request for writing user data related to the current subset when detecting the transaction conflict.

15. The non-transitory computer readable medium according to claim 12, prioritizing the user transaction write request for writing user data related to the current subset over the user transaction write request for writing user data related to the next subset and when detecting the transaction conflict.

16. The non-transitory computer readable medium according to claim 11 wherein the set of the database entries comprises multiple rows of the database and wherein the current subset is a row of the multiple rows.

17. The non-transitory computer readable medium according to claim 11 wherein the set of the database entries comprises multiple columns of the database and wherein the current subset is a column of the multiple columns.

18. The non-transitory computer readable medium according to claim 11 wherein the marking of the current subset as being moved comprises setting a current subset status indicator to a first value.

19. The non-transitory computer readable medium according to claim 18 wherein the current subset status indicator is a cell in a hidden column of the database.

20. The non-transitory computer readable medium according to claim 11 wherein the linking the current subset to the location of the next subset that stores instructions for setting a value of a pointer associated with the current subset to an address of the next subset.

* * * * *